UNITED STATES PATENT OFFICE.

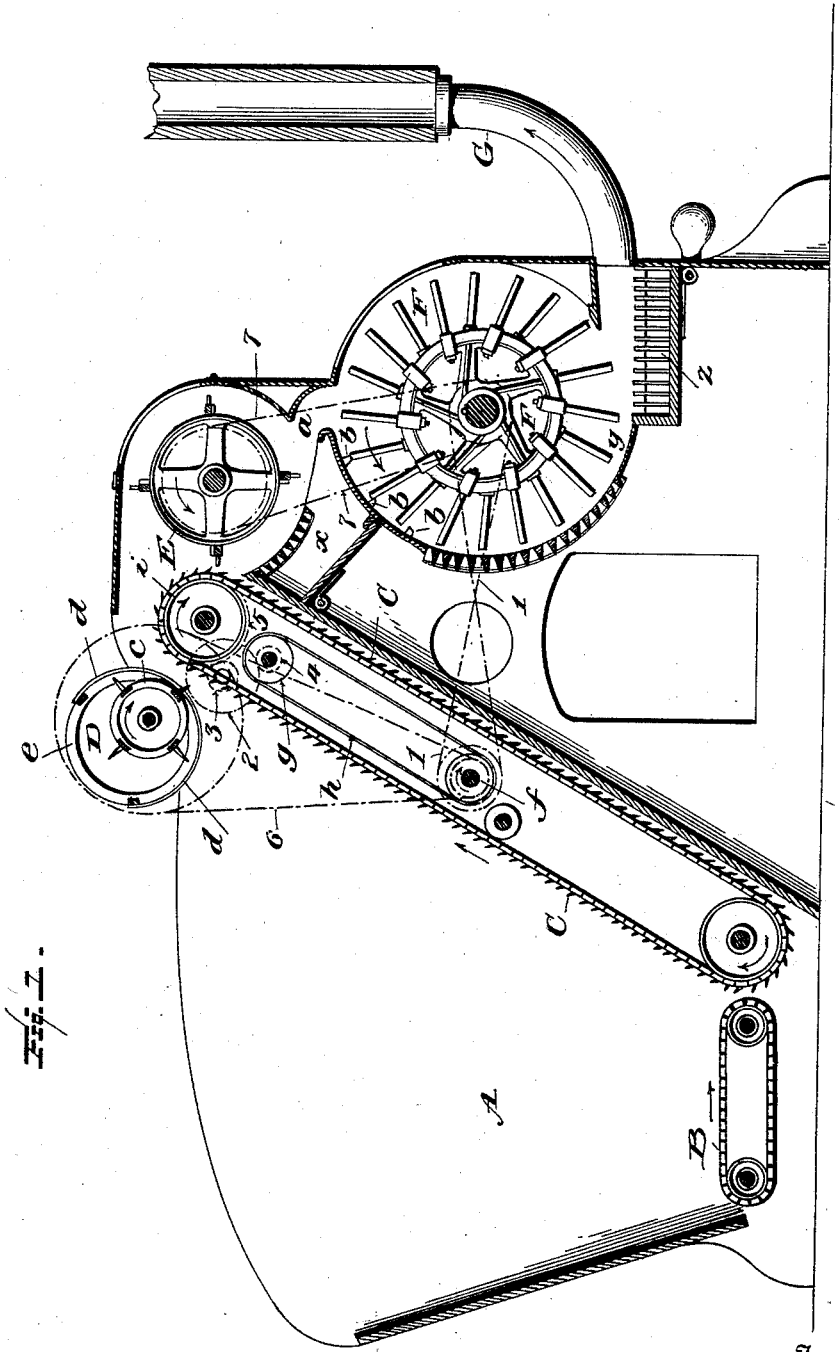

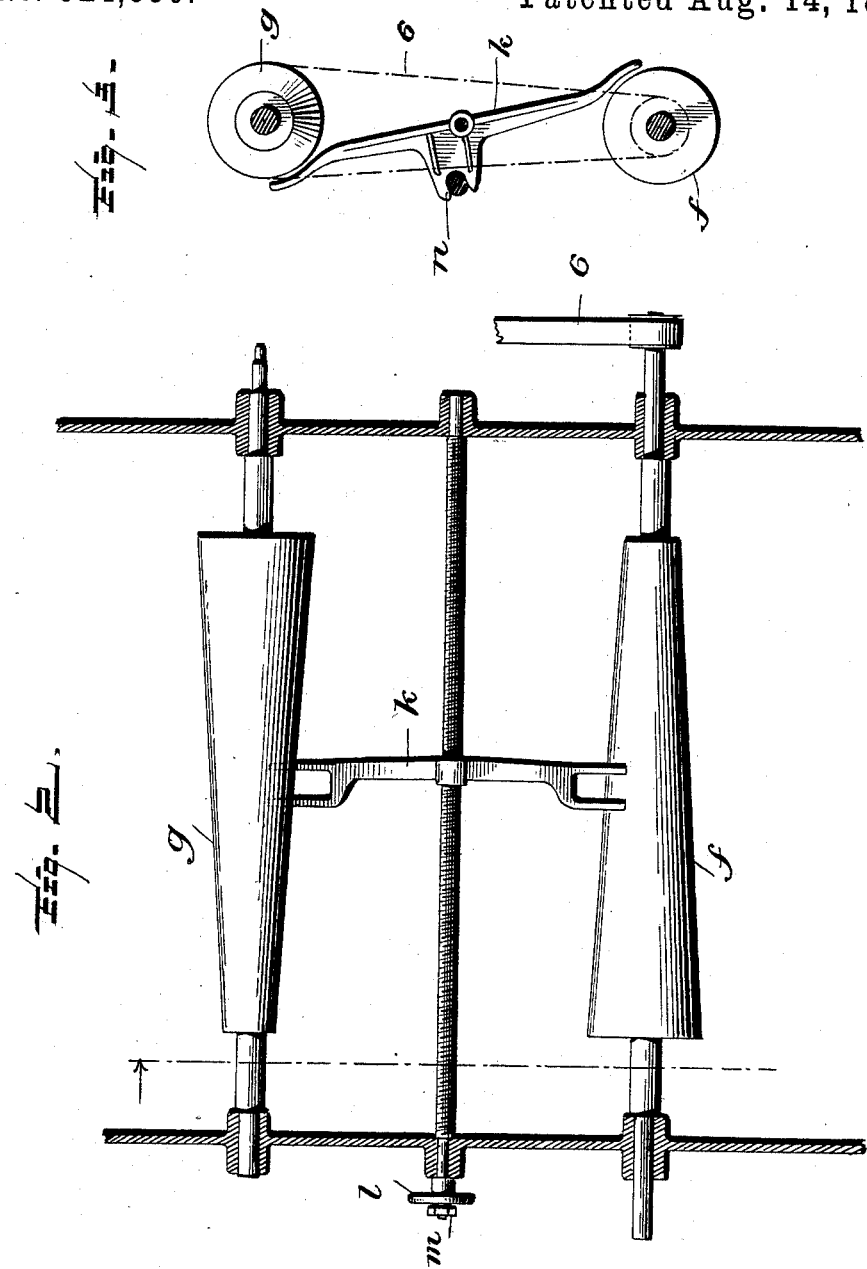

JAMES C. POTTER, OF PAWTUCKET, RHODE ISLAND.

FEEDING MECHANISM FOR MACHINERY FOR OPENING AND PREPARING COTTON.

SPECIFICATION forming part of Letters Patent No. 524,650, dated August 14, 1894.

Application filed April 23, 1894. Serial No. 508,699. (No model.)

*To all whom it may concern:*

Be it known that I, JAMES C. POTTER, residing in Pawtucket, in the State of Rhode Island, have invented certain new and useful Improvements in Feeding Mechanisms for Machinery for Opening and Preparing Cotton, &c., of which the following is a specification.

My invention relates to what are known as self-feeders for cotton openers and like machinery and it consists of an improved construction and arrangement of mechanism of that character which can best be explained and understood by reference to the accompanying drawings, in which—

Figure 1 is a longitudinal vertical section, partly in elevation, of so much of a cotton opening and cleaning machine as needed for the purpose of explanation. Fig. 2 is a front sectional elevation of the cones and mechanism for adjusting the cone belt by which the speed of travel of the spiked lifting apron is regulated. Fig. 3 is a sectional side elevation of the mechanism in Fig. 2.

The machine represented in the drawings is a combined self-feeder and opener.

A is the hopper on the bottom of which is the horizontal carrying apron B; and C is the spiked lifting apron—both of the aprons being power driven and moving in the direction of the arrows. At the upper end of the hopper near the top and front of the lifting apron is the equalizing doffer or comb D. On the other side of the lifting apron from the comb is the feeder beater E; and below the last named device is the opener beater proper F, the case of which is connected to the case of the feeder beater E by a short communicating throat or passage $a$ through which the cotton taken from the lifting apron by the feeder beater E is fed directly into the opener.

The feeder beater E, which revolves in the direction of the arrow thereon, has teeth or projecting flanges or webs (preferably of leather) which wipe off the cotton from the lifting apron, and open it up to some little extent, and convey it to the opener F. This device revolving at high speed, and having co-operating teeth or projections $b$ on the interior of its case or cylinder, just adjoining the throat $a$, strikes the cotton with force and opens it so as to effectually remove from it the seeds and trash, which otherwise would remain to be squeezed and pressed into the cotton, upon passage of the material through the feed rolls of the opener or breaker lapper which next may act upon it.

The feeder beater has in connection with its case a grid and dropping chamber $x$; the opener beater has a similar grid and dropping chamber $y$; and it also has a second grid and closed chamber $z$, to receive the dust and finer refuse which otherwise would be carried through the machine.

The cotton passes out from the opener into a conveying trunk G through which it can be carried to any suitable machinery for next operating on it. Or if desired it can pass from the opener directly to a revolving cage or cages, as in my Patent No. 482,194, of September 6, 1892. The equalizing doffer comb D, of my present machine has the same function as the equalizing doffer of my patent aforesaid—that is to say it regulates the delivery of the stock by the lifting apron—the teeth of the doffer or comb removing all stock in excess of a predetermined quantity—this quantity being regulated by the degree to which the teeth of the comb project from their surrounding cylinder.

The comb teeth are mounted in a rotating power driven drum $c$, and they project through slots $d$ in a stationary surrounding cylinder $e$ mounted eccentrically upon the axis of the drum, and capable of rotary adjustment so as to regulate the extent to which the teeth shall protrude into the throat or passage between said cylinder and spiked apron. In place of this equalizing doffer, I can use the doffer of my patent aforesaid, or any other suitable known style of doffer for the purpose.

By the conjoined action of the feeder beater E, and the opener beater F, the cotton is very thoroughly shaken up and beaten from both sides and opened and thus freed in great measure from all dirt and trash before it reaches any feed rolls.

In a combined self-feeder and opener of this kind it is desirable and indeed quite necessary to provide means for regulating the feed movement of the lifting apron. This I do by means of motion transmitting instrumentalities comprising among other things two cones and a connecting belt arranged in the same way as in eveners for cotton openers, together with means for shifting or adjusting the belt lengthwise on the cones so as to vary the speed of the driven cone relatively to that of the driving cone. These parts also I locate in the space inclosed by the spiked lifting apron, thus economizing space, and getting the parts in a position which at once is convenient and protected. They are shown thus located in Fig. 1. The driving cone is seen at $f$, the driven cone at $g$ and the connecting belt at $h$. The gearing is indicated by dotted lines. The driving cone $f$ takes its motion from the power driven opener beater F by cross belt 1. The lifting apron takes its motion from the driven cone $g$, through a double or compound intermediate 2, 3,—the larger gear 2, meshing with a pinion 4 on the axle of the driven cone, and the smaller gear 3 meshing with a spur gear 5 on the axle of the upper carrying drum $i$ of the lifting apron. The equalizing doffer or comb, is driven from the driving cone by belt 6; and the feeder beater is driven from the opener beater by belt 7. The belt $h$ is adjusted lengthwise of the cones by means of a shipper or shipping fork $k$, which is mounted on the screw threaded rotary adjusting shaft, supported in proper bearings in the sides of the hopper, and having one of its ends projecting through to the outside of the hopper, and there provided with a hand wheel $l$ for turning it, and a clamp nut $m$ for holding it in adjusted position, as seen in Fig. 2. The shipping fork on its back is jawed as at $n$ (Fig. 3) to receive the fixed guide rod by which it is steadied and guided in its movement.

Having described my improvements and the best way known to me of carrying the same into effect, what I claim, and desire to secure by Letters Patent, is as follows:

1. The combination of the lifting apron, the feeder-beater, and the opener-beater placed below and in communication with the feeder-beater, substantially as set forth.

2. The combination of the lifting apron; the feeder-beater and its inclosing shell or case; the opener-beater and its inclosing shell or case; and a communicating throat or passage leading from the lower part of the feeder-beater case into the upper part of the opener-beater case, substantially as and for the purposes hereinbefore set forth.

3. The combination of the adjustable equalizing doffer, the lifting apron; means for varying the rate of travel of the said apron; the opener-beater; and the feeder-beater, interposed between the opener-beater and the feed apron, and acting to strip the stock from the lifting apron and to deliver it to the opener-beater, as and for the purposes hereinbefore set forth.

In testimony whereof I have hereunto set my hand, before two subscribing witnesses, this 20th day of April, 1894.

JAMES C. POTTER.

Witnesses:
 SOLAMON ROBERTSON,
 THOMAS P. BARNEFIELD.